United States Patent [19]
Langille

[11] Patent Number: 5,223,312
[45] Date of Patent: Jun. 29, 1993

[54] MULTIPLE RETROREFLECTIVE STRIPING METHOD AND STRUCTURE

[76] Inventor: John D. Langille, 3909 Ocean Blvd., Ft. Lauderdale, Fla. 33308

[21] Appl. No.: 795,838

[22] Filed: Nov. 21, 1991

Related U.S. Application Data

[63] Continuation-in-part of Ser. No. 461,457, Jan. 5, 1990, abandoned, and a continuation-in-part of Ser. No. 611,750, Nov. 7, 1990, abandoned.

[51] Int. Cl.$^5$ .................. B32B 7/12; B32B 7/14; B60R 13/00; G02B 5/128
[52] U.S. Cl. .................. 428/31; 428/354; 428/202; 359/529; 359/530; 359/531; 359/536; 359/538
[58] Field of Search .................. 428/31, 354, 352, 40, 428/202; 359/529, 530, 531, 536, 538

[56] References Cited

U.S. PATENT DOCUMENTS

| | | | |
|---|---|---|---|
| 3,172,942 | 3/1965 | Berg | 359/536 X |
| 3,190,178 | 6/1965 | McKenzie | 350/105 |
| 4,143,192 | 3/1979 | Hayden | 428/31 |
| 4,555,161 | 11/1985 | Rowland | 359/530 |
| 4,712,868 | 12/1987 | Tung et al. | 359/531 X |
| 4,950,525 | 8/1990 | Bailey | 350/105 |
| 5,069,964 | 12/1991 | Tolliver et al. | 359/529 X |
| 5,080,463 | 1/1992 | Faykish et al. | 359/536 |

*Primary Examiner*—George F. Lesmes
*Assistant Examiner*—D. R. Zirker
*Attorney, Agent, or Firm*—Richard C. Litman

[57] ABSTRACT

Reflective tape for pinstriping of automobiles or other vehicles. The tape has strips of retroreflective material sandwiched between a bottom release liner of polyethylene coated paper and a clear top release liner having an adhesive undersurface for retaining the tape composite intact with the strips parallel one another prior to and during application to a vehicle. The retroreflective material is highly visible at night for safety. The strips include pressure-sensitive adhesive. When the tape is applied to a vehicle, thin pinstripes of retroreflective material are seen. The material may be colored to contrast with the color of the vehicle paint, which is visible on either side of the tape and also through the open middle section between the pinstripes of retroreflective material. The strips are applied by peeling away the bottom liner as the top liner and strips are applied to a surface; thereafter, the top release liner is peeled away leaving only the two retroreflective material strips on the surface. The tape is made by sandwiching the strips between the bottom and top release liners.

6 Claims, 1 Drawing Sheet

MULTIPLE RETROREFLECTIVE STRIPING METHOD AND STRUCTURE

CROSS REFERENCE TO RELATED APPLICATIONS

This is a continuation-in-part of my prior design patent application Ser. No. 07/461,457, filed Jan. 5, 1990, now abandoned, and a continuation-in-part of my prior utility patent application Ser. No. 07/611,750, filed Nov. 7, 1990, now abandoned.

FIELD OF THE INVENTION

The present invention relates to retroreflective tape which aids night time visibility of objects such as automobiles.

DESCRIPTION OF THE PRIOR ART

Reflective tape has been used to increase the visibility at night to drivers of vehicles and pedestrians. The tape includes, either on the surface or beneath a protective transparent layer, many small optical elements (such a glass spheres) which reflect light strongly back toward a light source with only a narrow angular spread (retroreflection).

The elements are spread over the area of the tape to form, in aggregate, a surface exhibiting ordinary diffuse reflection when the illuminating light source is angularly far from the eye, and enhanced narrow-angle retroreflection when the eye is close to the illuminating source and the angle is small.

An area covered with such elements is highly visible to the driver of a vehicle at night for two reasons. First, the angle formed by the vehicle's headlights, the optical element, and the driver's eyes is a small angle, less than the angle of spread of the retroreflected light from the headlights; thus the driver sees the retroreflected light. Second, since the angular spread of light reflected from the elements is small, the retroreflection appears to be very bright. The light power is not dissipated over a large solid angle.

The retroreflective optical elements are packed densely on the tape to achieve the greatest reflectance. The density of packing is a major determinant of apparent brightness. The other main determinant is the angular spread. This angle cannot be reduced too far, or the tape will be visible only when the elements are so far from the driver of a vehicle that the angle between the driver's eyes and his headlights is small. (In such a case the driver would see the tape far off, and then it would disappear as he came closer.) Also, large objects covered with retroreflective tape could not be seen as a whole.

When used on an automobile, retroreflective tape not only appears as a lighted object to attract the attention of a driver of another vehicle, but also gives the driver an impression of the size and orientation of the automobile if the tape is applied over a large area of the automobile.

Retroreflective tape may be made in various colors as well as white. The color will typically be the same in both narrow-angle and diffuse reflection, although the colors might be made different by various means.

Reflective tape typically includes a pressure type adhesive strip initially covered by a protective release liner. The protective liner is removed to expose the adhesive, and the tape may then be applied to a surface. This sort of tape works well on objects with smooth surfaces, such as automobiles.

Before my invention, it was not known that retroflective sheet materials could be narrowly sliced or cut so as to produce pinstripes, which ordinarily have a width on the order of ⅛" or less and 1/16" or less; some are slightly wider, being on the order of 9/64" or so wide. In fact, one idea was to use a narrow sliver of mirror material mounted in a strip of molding and applied to a vehicle body. However, the mirror material will not bend so the structure is unsuitable for vehicle use. Moreover, mirror material does not provide the high visibility found with the use of retroflective materials.

None of the above inventions, taken either singly or in combination, is seen to describe the instant invention as disclosed and claimed.

Heretofore, retroreflective tape has suffered from the drawback that if it is wide, its appearance is unattractive to many automobile users who prefer narrow "pin" stripes to wide stripes on their automobiles; if narrow, it is less visible; and it is also less bright, as fewer of the optical elements are included per linear inch, so it was thought. In fact, prior to my invention, the only acceptable use for retroflective materials was on commercial vehicles, where style and attractiveness are less than minimal considerations.

Another disadvantage of thin tape is that it is difficult to properly align when putting it onto an automobile, since it tends to not follow a straight line or a gradual curve. It is especially difficult to put one pin stripe next to another so that the two are parallel. In direct contradistinction thereto, the instant invention provides a parallel retroflective material pinstripe structure of at least two elongate strips sandwiched between a bottom release liner and a top release liner, the bottom liner being peeled away as the top liner and strips are applied to a vehicle surface whereupon the top liner is peeled off, thus resulting in an array of neatly applied, parallel pinstripes of reflective material interconnected only by the surface to which they are applied.

SUMMARY OF THE INVENTION

The present invention comprises reflective tape for pinstriping of automobiles. The tape has parallel strips of retroreflective material sandwiched between bottom and top release liners. The retroreflective material is highly visible at night for safety. The tape strips are backed with a pressure-sensitive adhesive as is the top release liner so as to maintain the strips parallel one another as the tape is applied to a vehicle surface, the bottom release liner being peeled off as the top liner and strips are applied. Then the top release liner is removed. When the tape is thus applied to a vehicle, thin pinstripes of retroreflective material are seen. The material may be colored to contrast with the color of the car paint, which is visible on either side of the pinstriping and also through the middle section between the strips of retroreflective material. Thus in the daytime, the appearance of the car is enhanced by colored pinstripes. At night, the two retroreflective strips are highly visible for safety, visibility being unencumbered by a top web layer interconnecting the strips which is common in prior art parallel pinstriping tape using simply reflective tape. The strips may be arbitrarily narrow but will still be easy to align onto the car since the tape top release liner is relatively wide and maintains the strips parallel one another during application.

Accordingly, one object of the present invention is retroreflective material pinstriping including at least two strips, easily applied parallel one another, which are attractive in appearance.

Another object is retroreflective material pinstriping including at least two strips sandwiched parallel one another between a bottom release liner and a top release liner, the top liner maintaining the strips in parallel relationships as the strips are applied to a vehicle surface.

A further object is a method of making pinstriping tape which includes sandwiching parallel retroreflective material strips between two release liners which is easy to apply to a vehicle surface in correct alignment.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
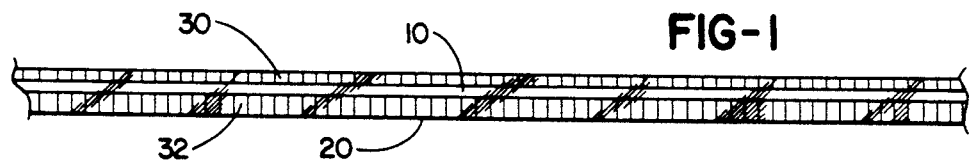
FIG. 1 is a top, plan view of the invention showing a tape segment.
Figure 2:
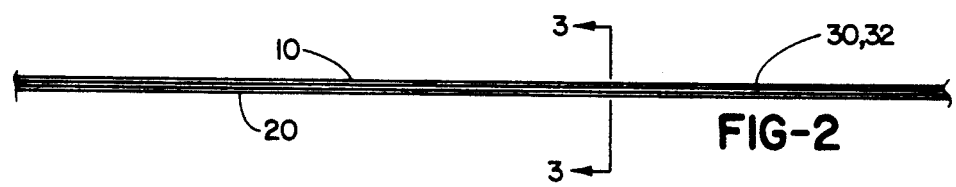
FIG. 2 is an elevation view of the invention as shown in FIG. 1.
Figure 3:
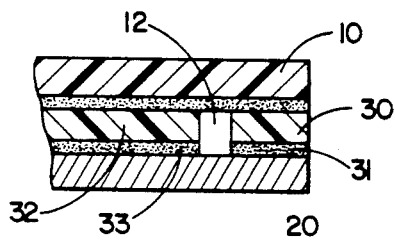
FIG. 3 is an enlarged scale, cross section view of the invention, drawn along lines 3—3 of FIG. 2, and showing portions of the invention in exaggerated scale for clarity.
Figure 6:
Figure 7:
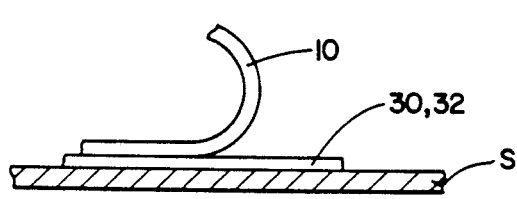
Figure 8:
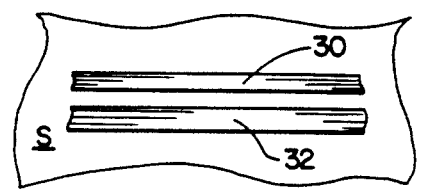
FIG. 8 is a perspective view similar to FIG. 4 but showing the two parallel retroflective material strips of the invention applied to a vehicle surface after both the bottom and top release liners have been removed.

The present invention, as shown in the drawings, is retroreflective tape. In FIG. 1 the tape is shown as it would be seen prior to application to the surface of a car, for example. The tape comprises a top release liner 10 of flexible, transparent or translucent, uncolored plastic material (for example, vinyl); a bottom release liner 20; and intermediate, parallel strips 30,32 of retroreflective material sandwiched between top release liner 10 and bottom release liner 20. Top release liner 10 includes a bottom layer 12 of pressure sensitive adhesive 12, as seen in FIG. 2; the strength of adhesive 12 is relatively weak so that after application of strips 30,32 to a surface S (FIGS. 5-8), top release liner 10 may be readily peeled away from strips 30,32 as is shown in FIG. 7. Conversely, strips 30,32 are provided with a much stronger pressure sensitive adhesive in the form of layers 31,33, respectively, for permanent attachment of strips 30,32 to a surface S, as shown in FIG. 8. One example of a suitable adhesive for layers 31,33 is AVERY brand MR5-510, a clear acrylic based, solvent borne, permanent pressure sensitive adhesive. In any event, the compositions of adhesives 12 and 31,33 may be selected from a number of available options well known in the art and, apart from the use herein shown, form no part of the instant invention.

The strips 30,32 include optically retroreflective elements, such as small glass spheres or right angle corner reflectors, which reflect light preferentially in directions close to the direction of incidence of the light reflected. These layers are adhered or otherwise fixed to the tape 10 in such a way that the retroreflector elements are visible from the front through the transparent tape 10.

Either right-angle reflectors or spheres may be used to make the retroflective layer. The type used in the preferred embodiment is a matter of design choice.

The present invention may use spheres. As is well known in the prior art, a plurality of small glass spheres may be disposed in a plane over a plastic in which they are partially embedded. The protruding, exposed surfaces of the spheres are coated with a reflective specular layer, such as a thin layer of aluminum. The index of refraction of the sphere material is chosen so that light entering a sphere is refracted through the interior of the sphere to converge to a focus at the back surface. With a specular coating on the back surface of the sphere, the light reflects off the reflective layer and by the laws of reflection and refraction retraces its path, causing retroreflection. This structure is disclosed in U.S. Pat. No. 3,190,178 issoed to E. L. McKenzie.

Another structure suitable for the present invention is disclosed in U.S. Pat. No. 4,950,525 issued to Bailey. In this design, the glass spheres are separated from the specular layer by a layer of transparent material. This design allows the material to be stretched without adversely affecting the retroreflectivity. In any event, one product found useful with the present invention is retroreflective material manufactured by the Avery-Fasson Corporation. This material can be cut to pinstripe widths of 9/64" or less. By way of example, a tape according to the present invention can have an overall width of 5/16" with a strip 32 being ⅛" wide and a strip 30 being 3/32" wide; the space between the strips 30,32 would be 3/32" wide. Another tape, also having an overall width of 5/16" has a strip 32 which is 9/64" wide and a strip 30 which is 3/32" wide, there being a space 5/64" wide between the strips.

The backing 20 is of a material, such as polyethylene coated Kraft paper, to which the adhesive will not stick. When the tape is to be applied, the backing layer 20 is peeled off and discarded, and the remaining tape layers 10 and 30,32 are applied.

The Kraft paper release liner may also be waxed or otherwise coated, as is well known in the prior art. Examples of particular materials which may be used are sold under the trademark STAFLAT as type 90# Imagemaker Plus White and as type 94# Imprinted White. These are distributed by the Avery-Fasson Corporation. Both are Kraft papers coated on both sides with polyethylene.

The adhesive 12 and the top release liner 10 should be translucent or transparent. This is so that, as the tape is applied to a surface S, that surface and the two strips 30,32 will be visible to the artisan and it can be readily assured that the two strips 30,32 retain their parallel relationship.

The top liner 10 and adhesive 12 need not be transparent or clear in the sense that one can see clearly through them. They should, however, be translucent, meaning that they pass light without substantially decreasing its intensity or changing its color. (The class of translucent objects is thus seen to include the class of transparent objects.) One example of material suitable for the strip 10 is 5.5 mil thick vinyl.

In this specification and the following claims, "translucent" means either translucent or transparent.

The narrow-angle retroreflected light from the strips 30,32 may be colored by coloring the elements, or by embedding them in colored material. The elements may also be placed onto a colored background. The diffuse or ordinarily reflected light, at arbitrary angles of reflection from the strips 30,32 may be colored with the same color as the retroreflected light, or with a different color, depending on the design and the structure of the strips 30,32. The diffuse light coloration will determine the color of the strips 30,32 as seen during the day, when illuminated by daylight. The narrow-angle coloration will determine the color as seen at night by retroreflection when illuminated by headlights.

Figure 4:
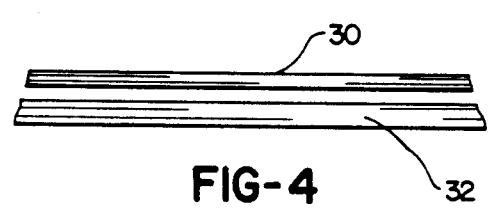
FIG. 4 is a perspective view of the invention shown in FIG. 1 but showing the bottom and top release liners removed.

The retroreflective strips 30,32 are preferably at least two in number, one being narrow as shown at 30 and one being broad as shown at 32. This is most clearly shown in FIG. 4, the strips 30,32 being divorced from the top and bottom release liners as shown in the figure.

Figure 5:
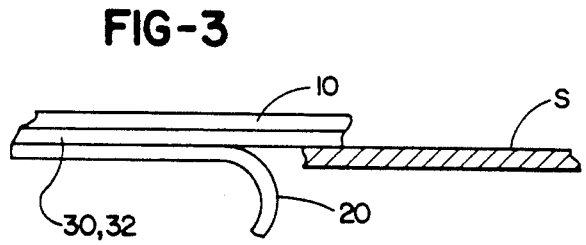
FIGS. 5 through 7 are side elevation views, partly in cross section, and schematically illustrating the steps of applying the invention to a surface, such as a vehicle surface.

The single wide tape with two parallel pin stripes makes for easy application of two pin stripes at once. If two different tapes were used, aligning and applying the two tapes would be difficult. Conversely, with this invention such application is rather easy. The steps of applying the strips are illustrated in FIGS. 5-7. As seen in FIG. 5, bottom liner 20 is peeled away from the strips 30,32 with top release liner remaining attached to assure the parallel relationship of the strips 30,32 remains intact as the tape is applied to a surface S. As seen in FIG. 6, strips 30,32 still with top liner 10 have been applied to surface S and the bottom liner 20 has been removed and discarded. Thereafter, top release liner with its adhesive layer 12 may be peeled off and discarded, as shown in FIG. 7. The resultant arrangement of strips 30,32 is best seen in FIG. 8; the strips are free of interconnection to one another above surface S and no conventional web of plastic remains which might impair the visibility of the retroreflective material strips 30,32. Preferably, each strip 30,32 with its adhesive layer 31,33, respectively has a thickness in the range of from 5.5 mils to 6.5 mils; thickness varies depending on the particular retroflective material chosen for use with the invention.

Figure 9:
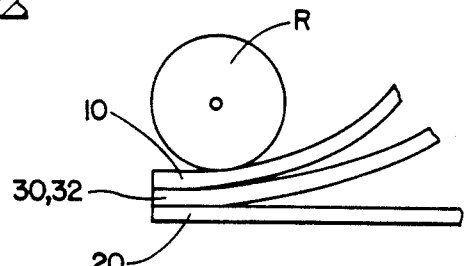
FIG. 9 is a partial, somewhat schematic elevation view showing one method of making the invention.

FIG. 9 illustrates one method of manufacture of the tape making up the invention. A bottom release liner 20 with strips 30,32 and top release liner 10 are sandwiched together as by a roller R, the adhesives 12,31,33 then retaining the composite tape intact until application of the tape to a surface. Ordinarily, the tape is wound about itself to form a roll for economy of storage and marketing.

Two thin stripes or strips 30,32 at night produce greater night visibility (given the same total area of retroreflective material) as would a single stripe. This is because the object is perceived as being larger than it really is.

It is also to be noted that pinstriping which runs along the sides of an automobile, or around the back, or otherwise outlines the automobile, gives the driver of another vehicle much more information about the automobile than do the ordinary one-dimensional spot retroreflectors. The driver will perceive the automobile as a whole object and instantly judge its size and orientation. With point retroreflectors, it is more difficult to judge the size and orientation of the automobile.

It is to be understood that the present invention is not limited to the sole embodiment described above, but encompasses any and all embodiments within the scope of the following claims.

I claim:
1. A pinstripe tape structure comprising:
   a bottom release liner having an upper, first face and a lower, opposing second face;
   at least a pair of spaced apart, parallel strips of retroreflective tape material arrayed on said release liner, each said retroreflective tape strip having an upper, first face and a lower, opposing second face;
   a first coating of permanent, high strength, pressure sensitive adhesive on and coextensive with said each retroreflective tape strip opposing second face;
   a top release liner of translucent material coextensive with said bottom release liner and placed on said first faces of said strips of retroreflective tape material, said top release liner having an upper, first face and a lower, opposing second face; and
   a second coating of low strength, pressure sensitive adhesive on and coextensive with said top release liner opposing second face;
   said pinstripe tape structure thus comprising a laminate made up of, from bottom to top, said bottom release liner, said high strength, permanent, pressure sensitive coatings, said parallel strips of retroreflective tape material, said second coating of low strength, pressure sensitive material, and said top release liner;
   said pinstripe tape structure having a width of about 5/16";
   one of said pair of strips of retroreflective tape material having a width in the range of from ⅛" to 9/64", the other of said pair of strips of retroreflective tape material having a width of about 3/32", the space defined between said pair of spaced apart strips of retroreflective material having a width in the range of from 3/32" to 5/64", the width dimensions of both strips of retroreflective material and said space defined therebetween being predetermined so that the overall width of the said strips of retroreflective material and the space defined therebetween is about 5/64";
   whereby, in use, said bottom release liner is peeled away from the rest of said pinstripe tape structure as said structure is applied to a surface, said rest of said pinstripe structure being maintained intact by said top release liner and said second, low strength, pressure sensitive adhesive coating, and, upon completion of application of said rest of said pinstripe structure to a surface, said top release liner with said second coating of low strength, pressure sensitive adhesive, is peeled away from said parallel strips, thus resulting in a pinstripe application of said parallel strips and their respective high strength, permanent pressure sensitive adhesive coatings only, on a surface, the ultimate result thus being a pinstripe array of substantially parallel pinstripes free of interconnection to one another above the surface to which they are applied.

2. The invention as claimed in claim 1 wherein said strips are unequal in width.

3. The invention as claimed in claim 1 wherein each said strip with its first adhesive layer has a composite thickness in the range of from 5.5 mils to 6.5 mils.

4. The invention as claimed in claim 1 wherein said bottom release liner is made of Kraft paper coated on both sides with polyethylene.

5. The invention as claimed in claim 1 wherein said one of said pair of parallel strips has a width of about ⅛", said other of said parallel strips has a width of about 3/32", and the space defined between said parallel strips has a width of about 3/32".

6. The invention as claimed in claim 1 wherein said one of said pair of parallel strips has a width of about 9/64", said other of said strips has a width of about 3/32", and the space defined between said parallel strips has a width of about 5/64".

* * * * *